S. S. SIMMONS.
Spring Seat for Vehicles.
No. 94,979. Patented Sept. 21, 1869.
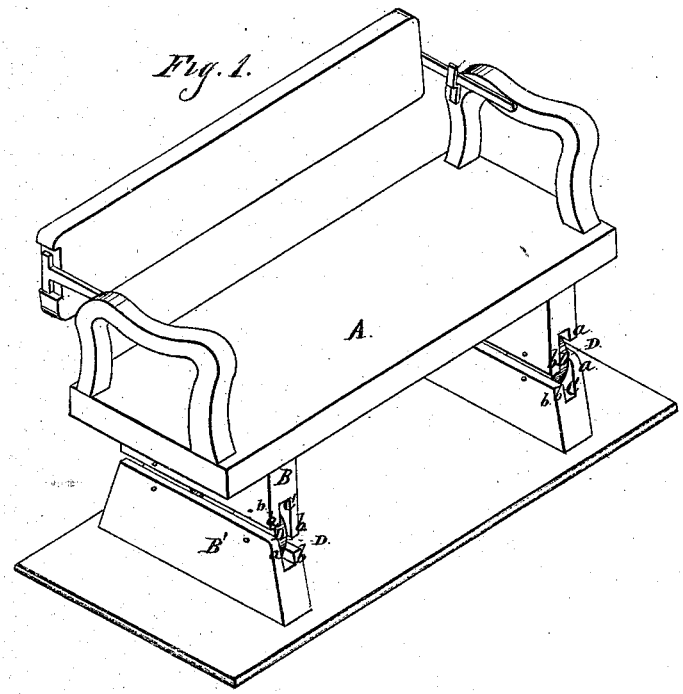
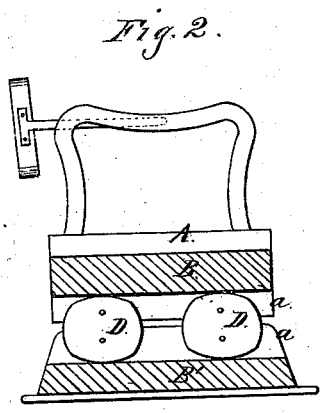

United States Patent Office.

SAMUEL S. SIMMONS, OF WATSONVILLE, CALIFORNIA.

Letters Patent No. 94,979, dated September 21, 1869.

IMPROVED SPRING-SEAT FOR VEHICLES.

The Schedule referred to in these Letters Patent and making part of the same.

*To all whom it may concern:*

Be it known that I, SAMUEL S. SIMMONS, of Watsonville, county of Santa Cruz, State of California, have invented an Improved Spring-Seat for Vehicles; and I do hereby declare the following description and accompanying drawings are sufficient to enable any person skilled in the art or science to which it most nearly appertains, to make and use my said invention or improvements without further invention or experiment.

My invention relates to certain new and useful improvements in seats for vehicles of all kinds, but is more particularly applicable to car and carriage-seats; and It consists in making grooves, for the reception of elastic disks, in the two parts into which the seat-supports are divided horizontally, with longer and shorter flanges on the opposite sides of the grooves, so arranged that the long flanges of the supports of the two ends of the seat shall limit or restrain its motion longitudinally, while left free to vibrate vertically upon the elastic disks.

For a further illustration of my invention, reference is had to the accompanying drawings, forming a part of this specification, in which—

A represents a car or other seat.

The seat is mounted, at each end, upon two supports B and B'.

These supports are made of wood or metal, and are equal in length to the width of the seat.

The supports B' are secured firmly to the floor of the car or vehicle, and have their upper edges grooved or channelled, as shown at C, one of the flanges, $a$, being longer than the flange $b$.

The upper pieces or supports B are secured to the bottom of the seat, in such a position that they will rest upon the supports B', and have their lower edges grooved in a manner similar to the lower ones, the flange $b$ being extended below the flange $a$, so that when the supports are placed, one above another, the extended flanges on the opposite sides will overlap each other, and thus prevent any side-motion of the seat.

Between these two supports, I place cushions, springs, or buffers, D, made of India rubber.

The cushions D are inserted in the grooves above and below, and secured by rivets or bolts, so that they may not be moved from their position, and are of sufficient height to keep the two supports separated a short distance apart.

The supports B and B' may not extend the entire width of the seat, if desired, but may be separated, so as to form two supports or legs at each end of the seat, and the rubber introduced between each upper and lower part, in a manner similar to that above described.

When applied to seats which extend longitudinally with the vehicle or car, the supports and buffers or cushions are applied so that the spring or swaying motion which they receive will be lengthwise with the seat, in order to break the shock or jar which comes from the direction of their length.

Having thus described my invention,

What I claim, and desire to secure by Letters Patent, is—

Making grooves, for the reception of elastic disks, in the two parts A and B of the seat-supports, with longer and shorter flanges, $a$ and $b$, on the opposite sides of the grooves, and so arranged that the long flanges of the supports of the two ends of the seat shall together limit or restrain its motion, either way, in the direction of its length, without other guides, substantially as shown and described.

In witness whereof, I have hereunto set my hand and seal.

SAMUEL S. SIMMONS. [L. S.]

Witnesses:
JOHN L. BOONE,
WM. GERLACH.